Patented Feb. 26, 1952

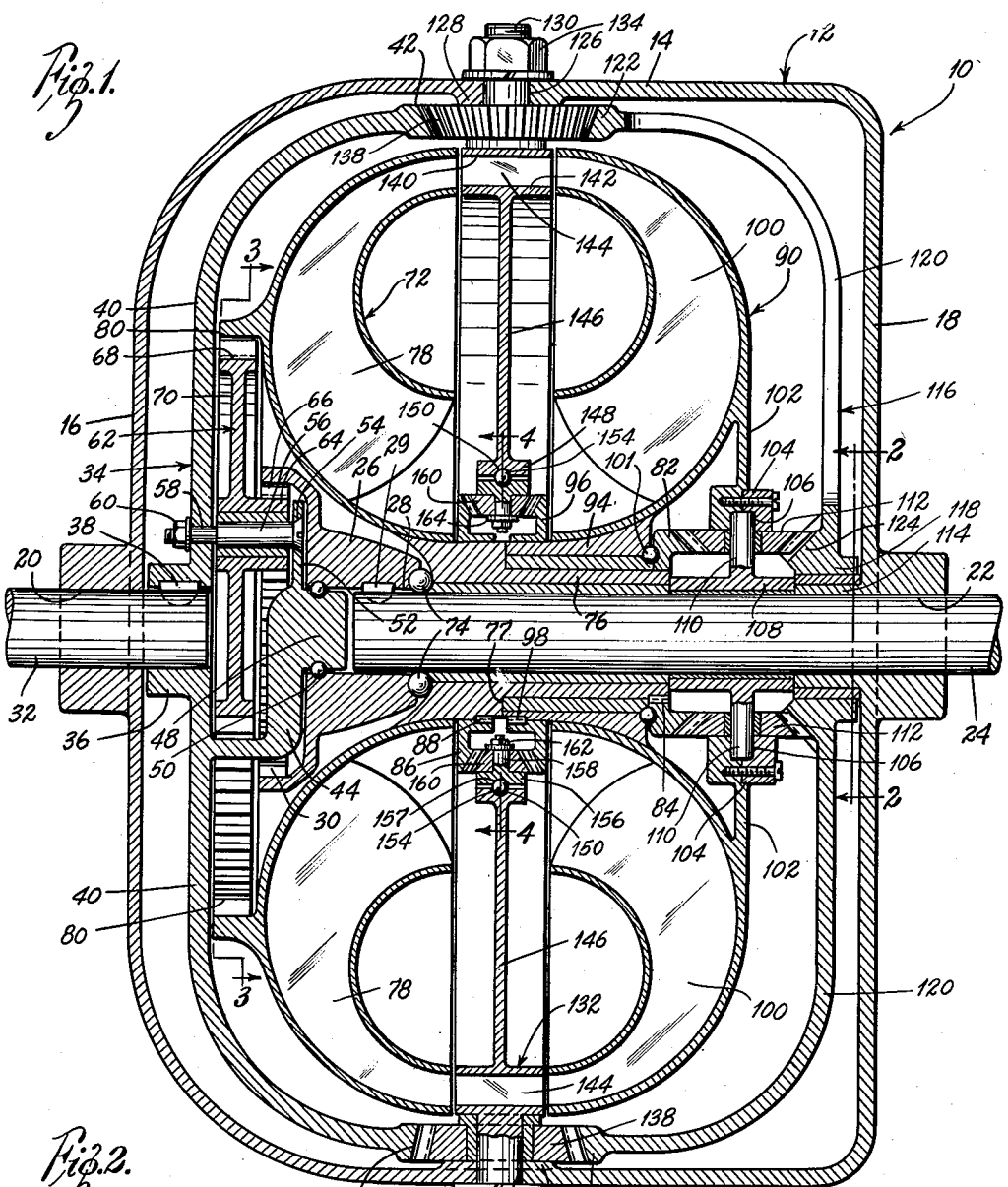

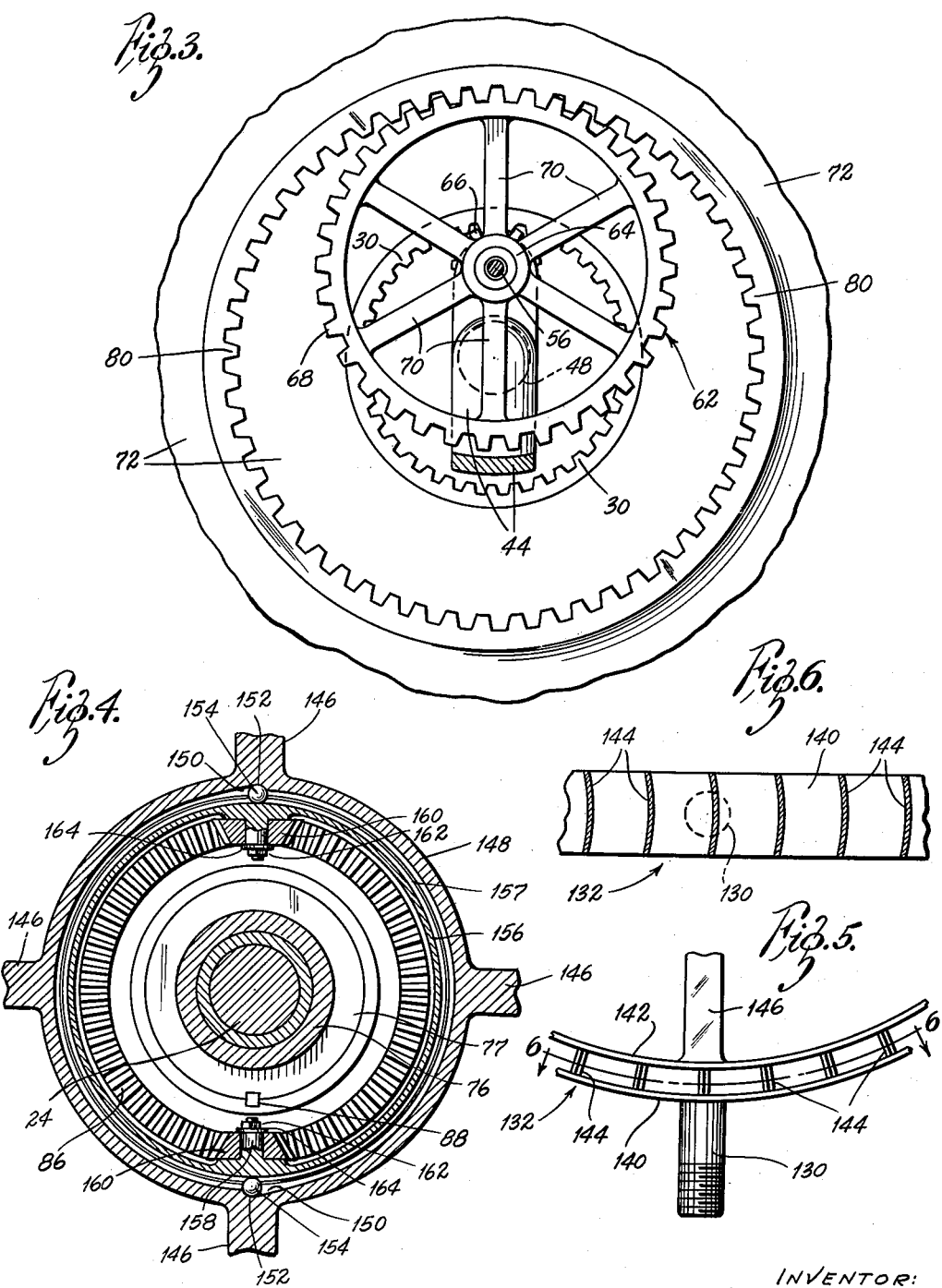

2,587,503

UNITED STATES PATENT OFFICE 2,587,503

TORQUE CONVERTER

Henry A. Meyer, St. Louis, Mo.

Application March 11, 1950, Serial No. 149,104

12 Claims. (Cl. 74—688)

The present invention relates generally to the transmission art and more particularly to a novel torque converter of the hydrokinetic type. In its preferred form the device comprises an engine shaft; a driven shaft; an impeller member; a planetary gear set interconnecting the engine shaft, the driven shaft, and the impeller member to drive the latter with the engine shaft at varying speeds depending on the speed of the driven shaft; a runner member adjacent the impeller member and geared to it so that in the lower speed ranges of the driven shaft it tends to rotate with the impeller member but at a slower speed; back gears interconnecting the impeller member, the runner member, and the driven shaft; and stationary vanes between the impeller member and the runner member to reverse the direction of the flow of the fluid leaving the impeller member so that there is a fluid force tending to force the impeller member and the runner member to rotate in opposite directions, thereby causing the runner's speed to decrease. This decrease in speed of the runner member, and the force causing it, is transmitted through the back gears to the driven shaft so as to cause the latter to rotate in the same direction as the engine shaft.

When the speed of the driven shaft exceeds the speed of the engine shaft by a predetermined amount, as for example when the vehicle is going down a hill, the engine shaft and the driven shaft are connected together through a gear train so that there is a direct mechanical connection between the engine shaft and the driven shaft, whereby the engine brakes the vehicle.

It is an object of the present invention to provide a torque converter in which the driven shaft can be driven faster than the engine shaft.

Another object is to provide a torque converter in which a mechanical connection is made between the engine shaft and the driven shaft when the latter exceeds the speed of the engine shaft by a predetermined amount.

Another object is to provide a torque converter in which there is a constant speed differential between the impeller member and the runner member at each speed of the engine shaft regardless of the speed of the driven shaft.

Another object is to provide a torque converter in which the quantity of fluid passing between the impeller member and the runner member remains substantially the same at each speed of the engine shaft regardless of the speed of the driven shaft, within a predetermined range.

Another object is to provide a torque converter in which the fluid reaction betwen the impeller member and the runner member urges them to rotate in opposite directions.

Further objects and advantages of the present invention will be apparent from the following description, reference being had to the accompanying drawings wherein a preferred embodiment of the present invention is snown, in which:

Fig. 1 is a vertical diametrical sectional view taken through a torque converter constructed in accordance with the teachings of the present invention;

Fig. 2 is a fragmentary vertical sectional view taken on the line 2—2 in Fig. 1;

Fig. 3 is a fragmentary vertical sectional view taken on the line 3—3 in Fig. 1;

Fig. 4 is an enlarged fragmentary vertical sectional view taken on the line 4—4 in Fig. 1;

Fig. 5 is a fragmentary end view of the bottom portion of the stationary vane ring as viewed from the left of Fig. 1; and Fig. 6 is a fragmentary horizontal sectional view taken on the line 6—6 in Fig. 5.

Referring to the drawings more particularly by reference numerals, 10 indicates generally a torque converter embodying the teachings of the present invention.

The torque converter 10 includes a housing 12 which is preferably of the conventional split type, and which has a side wall 14 and end walls 16 and 18. Journal bearings 20 and 22 are contained in the end walls 16 and 18, respectively.

Rotatably supported in the bearing 22 is an engine shaft 24 connected to a rotating power source (not shown), the shaft 24 extending approximately two-thirds of the distance through the housing 12.

A frusto-conical shaped gear member 26 containing a longitudinally extending passageway 28 therethrough is disposed on the end of the shaft 24 and fixedly attached to it by a key 29. The shaft 24 extends only partially through the gear member 26 as shown in Fig. 1. The larger end of the gear member 26 contains a depression, and an internal gear portion 30 is provided adjacent the periphery of the depression so as to constitute the orbit gear of a planetary gear set.

A driven shaft 32 which is connected to a load (not shown) is rotatably supported in the bearing 20.

Fastened to the inner end of the shaft 32 is a rear dish-shaped gear member 34. The rear gear member 34 includes a hub portion 36 which is keyed to the shaft 32 by means of a key 38, four elongated arcuate spokes 40 which extend outwardly from the hub portion 36, and a bevel gear 42 positioned at the outer ends of the supporting spokes 40.

A bracket-like element 44 having one end thereof formed integral with one of the supporting spokes 40 extends inwardly toward the end of the shaft 24 and contains a short shaft-like portion 48 which is disposed in the outer end of the passageway 28. Ball bearings 50 are positioned between the shaft-like portion 48 and the inner surface of the passageway 28 to permit free relative movement.

Extending normal to the shaft-like portion 48 is a short flange portion 52 which contains an opening 54 therein.

A rod-like member 56 having a threaded free end is disposed in the openings 54 and extends from the flange portion 52 rearwardly through an opening 58 contained in one of the supporting spokes 40. A nut 60 is disposed on the threaded end of the rod-like member 56 to maintain it in position.

A gear member 62 which constitutes the planetary gear of the planetary gear set, is rotatably mounted on the body portion of the rod-like member 56. It contains a hub portion 64 having a pinion gear portion 66 at the inner end which meshes with the internal toothed gear portion 30 or orbit gear, and a gear portion 68 at the other end which is supported on the hub portion 64 by a series of spokes 70 (Fig. 3).

An impeller member 72 is rotatably mounted on the engine shaft 24 adjacent the frusto-conical shaped gear member 26. A plurality of ball bearings 74 are disposed between the ends of the two so as to permit free relative movement. The impeller member 72 includes a hub portion 76 which has a shoulder 77 adjacent the center thereof and a set of impeller blades or buckets 78 mounted at one end. Formed integral with the rear surface of the blade portion is an internal gear portion 80 which constitutes the second orbit gear of the planetary gear set and which meshes with the gear portion 68.

A bevel gear 82 is fixedly mounted on the other end of the hub portion 76 by a key 84.

Mounted on the hub portion 76 between the impeller blades 78 and the shoulder 77 is another bevel gear 86 which is fastened to the hub portion 76 by a key 88.

Rotatably mounted on the hub portion 76 between the shoulder 77 and the bevel gear 82 is a runner 90. The runner 90 includes a hub portion 94 having a bevel gear 96 fastened adjacent one end by a key 98. Formed integral with the other end of the hub portion 94 is a set of runner blades or buckets 100. A plurality of ball bearings 101 are disposed between the hub portion 94 and the bevel gear 82 to permit free relative movement.

Extending inwardly from the front surface of the runner blades 100 are a pair of diametrically opposed flange elements 102 having socket-like portions 104 at the inner ends thereof which contain cylindrical recesses 106.

A sleeve-like member 108 is rotatably mounted on the engine shaft 24 adjacent the end of the hub portion 76 and in line with the flange-like elements 102. Extending outwardly from the sleeve-like member 108 are a pair of rod-like portions 110, the free ends of which are disposed in the recess 106.

Rotatably mounted on the rod-like portion 110 are bevel gears 112 which mesh with the bevel gear 82.

A hollow hub-like portion 114 extends inwardly from the end wall 18 about the engine shaft 24 and rotatably mounted thereon is a front dish-shaped gear member 116. The front gear member 116 includes a hub portion 118 and three elongated arcuate spokes 120 which extend outwardly therefrom and support a bevel gear portion 122 at the outer ends.

Formed integral with the hub portion 118 is a bevel gear portion 124 which meshes with the bevel gears 112.

A series of spaced openings 126 (Fig. 1) are formed in the side wall 14 of the housing 12 and around these openings on the inside of the housing are annular bosses 128.

Extending outwardly through these openings 126 are a series of threaded stud-like elements 130. These elements are formed integral with and support a stationary vane ring 132 which is disposed between the impeller member 72 and the runner member 90. Nuts 134 and lock washers 136 are disposed in the outer protruding free ends of the stud-like elements 130 to maintain the ring 132 in position.

Rotatably mounted on the stud-like elements 130 between the bosses 128 and the outer periphery of the vane ring 132 are a plurality of bevel gears 138 which mesh with the gear portions 42 and 122.

The stationary vane ring 132 (Figs. 1, 5 and 6) includes a flat outer ring-like element 140 and a flat inner ring-like element 142 spaced therefrom. Disposed between the two ring-like elements 140 and 142 are a series of curved vanes 144 (Fig. 6) which reverse the direction of flow of the fluid leaving the impeller blades 78.

Formed integral with the inner ring-like element 142 and extending inwardly therefrom are a series of spokes 146 which support a portion of a one-way clutch for preventing the driven shaft 32 from exceeding the speed of the engine shaft 24 by a predetermined amount.

Formed integral with the ends of the spokes 146 is an outer ring-like element 148 (Figs. 1 and 4) which forms a portion of the one way clutch and which contains two diametrically opposed grooves 150 in the inner face thereof. As shown in Fig. 4, the grooves 150 are of increasing depth and at their deep ends contain niches 152 to receive balls 154.

An inner ring-like element 156 is disposed adjacent the outer ring-like element 148 in rolling contact with the balls 154 and contains an annular groove 157 to receive the balls 154.

Extending inwardly from the inner surface of the inner ring-like element 156 are a pair of diametrically opposed stud-like elements 158 (Fig. 4) which rotatably support bevel gears 160 which mesh with the bevel gears 86 and 96.

Nuts 162 and washers 164 are disposed on the ends of the stud-like elements 158.

When in operation the torque converter 10 contains a predetermined amount of fluid such as lightweight oil (not shown).

*Operation*

Assuming that the engine shaft 24 is rotating in the clockwise direction as viewed from the right of Fig. 1 and that the rod-like member 56 and driven shaft 32 are stationary, the impeller member 72 will be driven with the engine shaft 24 through the gear members 26 and 62. For the purpose of discussion, it will be assumed that the size of these gear members are such that the impeller member 72 rotates at twice the speed of the engine shaft 24, when the driven shaft 32 is stationary.

When the driven shaft 32 is stationary, the front gear member 116 is also stationary because it is connected with the rear gear member 40 through the bevel gears 138 adjacent the side wall 14 of the housing.

Under these conditions, the impeller member 72 and the bevel gear portion 82 fixed at the end of the body portion 76 thereof will also be rotating at twice the speed of the engine shaft 24. Because the gear portion 82 and the gear portion 124 on the front gear member 116 are of the same size, and the gear portion 124 is stationary, the bevel gear 112 mounted on the runner member 90, and the runner member 90, will rotate in the same direction as the impeller member 72 but at one-half its speed. Thus, the impeller member 72 will rotate in the same direction as the engine shaft 24 but at twice its speed, and the runner member 90 will rotate in the same direction and at one-half the speed of the impeller member 72, or at the same speed as the engine shaft 24. Also, the bevel gear 86 fastened to the hub portion 76 of the impeller member 72 will be rotating at twice the speed of the engine shaft 24 and the bevel gear 96 which is fastened to the hub portion of the runner member 90 will be rotating at the same speed as the engine shaft. Therefore, because the gears 86 and 96 are the same size, the stud-like portions 158 and the inner ring-like member 156 of the one-way clutch will be rotating at one and one half times the speed of the engine shaft 24.

This set of conditions is shown at the ordinate marked "A" at the left-hand edge of the graph shown below. The ordinate "A" is at the position where the ratio of the R. P. M. of the driven shaft to the R. P. M. of the engine shaft equals zero, or in other words, when the driven shaft is stationary.

vane ring 132 wherein its direction is reversed so that it leaves the vane ring in a direction to oppose the rotation of the runner member and tending to rotate it in the direction opposite to that of the impeller member 72 and the engine shaft 24. However, the runner member 90 is also being driven from the engine shaft 24, through the impeller member 72, the bevel gear 82 and the pinion gear 112 thereby tending to force the fluid through the stationary vanes in the direction opposite to that caused by the impeller member 72. Thus, there is a force acting between the impeller member 72 and the runner member 90 tending to force them to rotate in opposite directions.

As this force causes the speed of the runner member 90 to decrease, the speed of the stud-like elements 110 which support the bevel gears 112 will decrease so as to cause the gear portion 124 of the front gear member 116 and the latter to start rotating in the counterclockwise direction. When this occurs, the front gear member 116 starts to drive the rear gear member 40 through the bevel gear pinions 138. The driven shaft 32 then starts to rotate in the clockwise direction.

As the speed of the driven shaft 32 increases, the speed of the bolt-like member 56, which is fastened to one of the spokes 40 and which

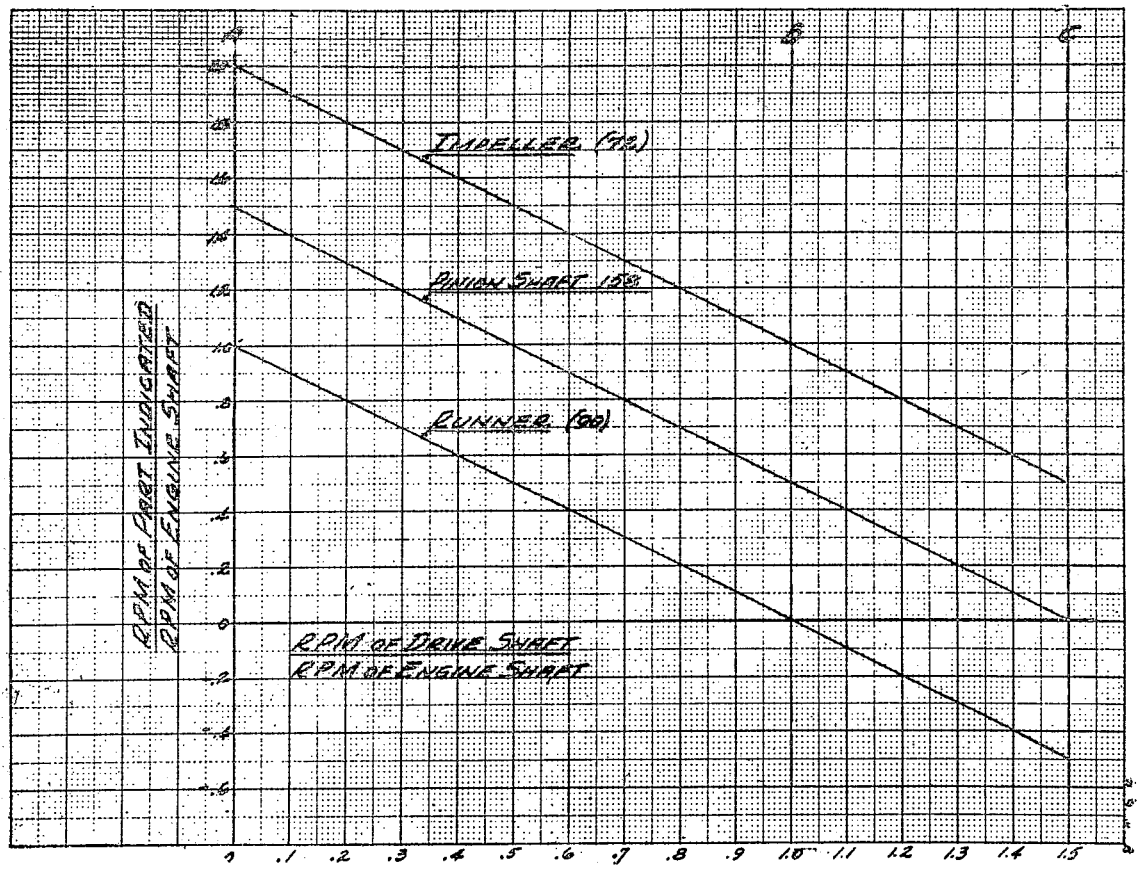

*Velocity ratio curves*

As the impeller member 72 rotates in the clockwise direction it throws the fluid outwardly due to centrifugal force, and because the outer ends of the buckets or blades 78 are smaller than the inner ends, the speed of the fluid will increase as it flows outwardly. When the fluid leaves the outer end of the impeller blades 78 it enters the carries the gear member 62, will increase in like manner, thereby causing the impeller member 72 to rotate at a decreased speed relative to the engine shaft 24. As the speed of the impeller member decreases, the speed of the runner member will continue to decrease in like manner so that the speed differential between the two will remain constant. As the speed of the driven shaft 32 continues to increase relative to the engine shaft 24, a point will be reached where the engine shaft 24, the frusto-conical shaped gear member 26, the planetary gear member 62, the impeller member 72, the rear gear member 34, and the driven shaft 32 are all rotating at the same speed in a sort of locked-up arrangement.

Under these conditions the front gear member 116 which is driven by the rear gear member 34 through the bevel gears 138 will be rotating at the same speed as the aforementioned group but in the opposite or counterclockwise direction. Thus, the gear portion 82 adjacent the end of the hub-like portion 76 of the impeller member 72, and the gear portion 124 on the front gear member 116 will be rotating in opposite directions at the same speed so that the stud-like portion 110, which rotatably supports the bevel gear 112, will be stationary relative to the housing, and consequently the runner member 90 will also be stationary. With the bevel gear 86 fixedly mounted on the impeller member 72 rotating at the same speed as the engine shaft 24 and with the bevel gear 96 fixedly mounted on the runner member 90 being stationary, the inner ring-like element 156 of the one-way clutch will be rotating in a clockwise direction at one-half the speed of the engine shaft 24. This set of conditions is shown at ordinate "B" in the above graph at the point where the ratio of the R. P. M. of the driven shaft to the R. P. M. of the engine shaft equal one, or in short, when both are rotating at the same speed.

As commented on above, and as indicated by the graph, there is a constant speed differential between the impeller member 72 and the runner member 90 when the speed of the engine shaft remains constant, regardless of the speed of the driven shaft. Because the volume of fluid which would pass through either the impeller member 72 or the runner member 90, if they were running separately, varies in approximate direct proportion to the speed of the member, the volume of fluid passing between the members when they are used together will be substantially constant because of this constant speed differential. Thus, the horsepower output of the torque converter 10 will be a substantially fixed percentage of the horsepower input for each speed of the engine shaft 24, regardless of the speed of the driven shaft 32, except when the runner member 90 turns in the direction opposite to that of the impeller member 72, as described below. As the speed of the engine shaft 24 is increased, the speed differential between the impeller member 72 and the runner member 90 is also increased so that the quantity of fluid passing between them is increased, thereby increasing the amount of power transferred to the driven shaft 32, again regardless of the speed of the latter.

Theoretically, under no load conditions the speed of the driven shaft 32 will continue to increase beyond the speed of the engine shaft 24 until there is no movement of the fluid between the impeller member 72 and the runner member 90, or in other words until the impeller member 72 and the runner member 90 are rotating at the same speed but in opposite directions. Under these conditions, with the bevel gear 86 mounted on the impeller member 72 and the bevel gear 96 mounted on the runner member 90 rotating at the same speed but in opposite directions, the inner ring element 156 of the one-way clutch will be stationary. This set of conditions is shown at ordinate "C" in the above graph at the point where the driven shaft is rotating at one and one-half times the speed of the engine shaft.

Although this condition could never be achieved by the engine shaft driving the driven shaft 32 because of the losses in the torque converter 10, it can be achieved when the load attempts to drive the engine, as for example, when the vehicle is going down a hill.

Thus, if the driven shaft 32 is caused to rotate by the weight of the vehicle at more than one and one-half times the speed of the engine shaft 24, the runner member 90 will become the impeller and will throw the fluid against the impeller member 72 so as to tend to increase the speed of the engine shaft 24 and the speed of the engine. However, under this arrangement there would be only a fluid connection between the driven shaft 32 and the engine shaft 24 tending to brake the load, which is not completely satisfactory. With the one-way clutch construction shown, however, this difficulty is overcome and a mechanical connection is made between the engine shaft 24 and the driven shaft 32. Thus, as the bevel gear 96 which is fastened to the runner member 90, tends to increase in speed in the counterclockwise direction so that it is rotating faster than the bevel gear portion 86 is rotating in the opposite direction, the inner ring element 156 of the one-way clutch mechanism will tend to rotate in the counterclockwise direction. However, when this occurs, the balls 154 are carried against the inclined portion of the grooves 150 so as to lock together the outer and inner ring elements 148 and 156, respectively. When these ring elements are locked together, the stud-like portions 158, which rotatably support the bevel gears 160, remain stationary so that there is a direct mechanical drive from the runner member 90, through the gear 160 to the impeller member 72, instead of merely a fluid connection as previously described.

Thus, it is apparent that there has been provided a novel torque converter which fulfills all of the objects and advantages sought therefor.

It is to be understood that the foregoing description and the accompanying drawings have been given only by way of illustration and example and that changes and alterations in the present disclosure which will be readily apparent to one skilled in the art are contemplated as within the scope of the present invention, which is limited only by the claims which follow.

What is claimed is:

1. A torque converter, comprising a housing; an engine shaft and a driven shaft rotatably mounted in the housing; an impeller member rotatably mounted in the housing; a runner member rotatably mounted in the housing adjacent the impeller member; fluid passage means disposed between the two members reversing the direction of flow of fluid between them so as to urge them to rotate in opposite directions; means interconnecting the impeller member and the runner member urging them to rotate in the same direction; and gear means operatively interconnecting the engine shaft, the driven shaft, the impeller member and the runner member to cause the driven shaft to rotate with the engine shaft responsive to the force of the fluid tending to rotate the impeller member and the runner member in opposite directions.

2. A torque converter, comprising a housing; an engine shaft and a driven shaft rotatably mounted in the housing; an impeller member rotatably mounted in the housing; a runner member rotatably mounted in the housing adjacent the impeller member; means associated with the two members reversing the direction of flow of fluid between them so as to urge them to rotate in opposite directions; means interconnecting the impeller member and the runner member urging them to rotate in the same direction; gear means operatively interconnecting the engine shaft, the driven shaft, the impeller member and the runner member to cause the driven shaft to rotate with the engine shaft responsive to the force of the fluid tending to rotate the impeller member and the runner member in opposite directions; and means preventing rotation of the runner member in the direction opposite to that of the impeller member at a speed in excess of the speed of the impeller member.

3. A torque converter, comprising a housing; an engine shaft and a driven shaft rotatably mounted in the housing; an impeller member rotatably mounted in the housing; a runner member rotatably mounted in the housing adjacent the impeller member; means associated with the two members reversing the direction of flow of fluid between them so as to urge them to rotate in opposite directions; means interconnecting the impeller member and the runner member urging them to rotate in the same direction; gear means operatively interconnecting the engine shaft, the driven shaft, the impeller member and the runner member to cause the driven shaft to rotate with the engine shaft responsive to the force of the fluid tending to rotate the impeller member and the runner member in opposite directions; and mechanical means rotatably connecting the runner member with the impeller member when the speed of the former, when rotating in the direction opposite to that of the impeller member, tends to exceed the speed of the impeller member.

4. A torque converter, comprising a housing; an engine shaft rotatably mounted in the housing; a driven shaft rotatably mounted in the housing; an impeller member rotatably mounted within the housing; means interconnecting the engine shaft, the driven shaft, and the impeller member to cause the latter to rotate with the engine shaft at speeds which vary depending on the speed of rotation of the driven shaft; a runner member rotatably mounted within the housing in association with the impeller member; stationary vanes reversing the flow of fluid between the two members so as urge them to rotate in opposite directions; means interconnecting the impeller member and the runner member urging rotation of the latter in the same direction as the impeller member; and means interconnecting the runner member and the driven shaft for rotating the driven shaft responsive to the force of the fluid urging the two members to rotate in opposite directions.

5. A torque converter, comprising a housing; an engine shaft rotatably mounted in the housing; a driven shaft rotatably mounted in the housing; an impeller member rotatably mounted within the housing; means interconnecting the engine shaft, the driven shaft, and the impeller member to cause the latter to rotate in the same direction as the engine shaft at speeds which vary depending on the speed of rotation of the driven shaft; a runner member rotatably mounted within the housing in association with the impeller member; stationary vanes between the impeller member and the runner member for reversing the direction of flow of fluid from the impeller member so as to urge the runner member to rotate in the direction opposite to the direction of rotation of the impeller member; means interconnecting the impeller member and the runner member urging rotation of the latter in the same direction as the impeller member; and means interconnecting the runner member and the driven shaft for causing rotation of the driven shaft with the engine shaft responsive to the force of the fluid on the runner member urging it in the direction opposite to the direction of rotation of the impeller member.

6. A torque converter, comprising a housing; an engine shaft and a driven shaft rotatably mounted in the housing; an impeller member and a runner member rotatably mounted in the housing; stationary vanes associated with the two members reversing the flow of fluid between them so as to urge them to rotate in opposite directions; a planetary gear train interconnecting the engine shaft, the driven shaft and the impeller member to rotate the impeller member with the engine shaft at varying speeds depending on the speed of the driven shaft; gear means interconnecting the impeller member and the runner member urging the latter to rotate in the same direction as the impeller member but at a slower speed; and gear means interconnecting the runner member and the driven shaft for rotating the latter responsive to the force of the fluid tending to rotate the runner member in the direction opposite to that of the impeller member.

7. A torque converter, comprising a housing; an engine shaft and a driven shaft rotatably mounted in the housing; an impeller member and a runner member rotatably mounted in the housing; stationary vanes associated with the two members reversing the flow of fluid between them so as to urge them to rotate in opposite directions; a planetary gear train interconnecting the engine shaft, the driven shaft and the impeller member to rotate the impeller member with the engine shaft at varying speeds depending on the speed of the driven shaft; gear means interconnecting the impeller member and the runner member urging the latter to rotate in the same direction as the impeller member but at a slower speed; gear means interconnecting the runner member and the driven shaft for rotating the latter responsive to the force of the fluid tending to rotate the runner member in the direction opposite to that of the impeller member; first gear means rigidly fastened to the impeller member; second gear means rigidly fastened to the runner member; and automatically operable means associated with said first and second gear means causing them to rotate at the same speed but in opposite directions when the speed of the runner member, when rotating in the direction opposite to that of the impeller member, tends to exceed the speed of the latter.

8. A torque converter, comprising a housing; an engine shaft and a driven shaft rotatably mounted in the housing; an impeller member and a runner member rotatably mounted in the housing; stationary vanes associated with the two members reversing the flow of fluid between them so as to urge them to rotate in opposite directions; a planetary gear train interconnecting the engine shaft, the driven shaft and the impeller member to rotate the impeller member with the engine shaft at varying speeds depending on the speed of the driven shaft; first gear means fastened to the impeller member; second gear means rotatably mounted on the runner member and in engagement with said first gear means so as to cause the runner member to rotate with the impeller member; and third gear means interconnecting the second gear means and the driven shaft whereby the driven shaft is caused to rotate with the engine shaft when the fluid from the impeller member reduces the speed of the runner member.

9. A torque converter, comprising a housing; an engine shaft and a driven shaft rotatably mounted in the housing; an impeller member and a runner member rotatably mounted in the housing; stationary vanes associated with the two members reversing the flow of fluid between them so as to urge them to rotate in opposite directions; a planetary gear train interconnecting the engine shaft, the driven shaft and the impeller member to rotate the impeller member with the engine shaft at varying speeds depending on the speed of the driven shaft; first gear means fastened to the impeller member; second gear means rotatably mounted on the runner member and in engagement with said first gear means so as to cause the runner member to rotate with the impeller member; and third gear means interconnecting the second gear means and the driven shaft whereby the relative difference in speed between the impeller member and the runner member remains constant for each speed of the engine shaft and the driven shaft is caused to rotate with the engine shaft when the fluid forces acting between the impeller member and the runner member causes a reduction in speed of the latter.

10. A torque converter, comprising a housing; an engine shaft and a driven shaft rotatably mounted in the housing; an impeller member and a runner member rotatably mounted in the housing; stationary vanes associated with the two members reversing the flow of fluid between them so as to urge them to rotate in opposite directions; a planetary gear train interconnecting the engine shaft, the driven shaft and the impeller member to rotate the impeller member with the engine shaft at varying speeds depending on the speed of the driven shaft; a first gear portion fastened to the impeller member; a back gear member rotatably mounted within the housing and having a second gear portion; gear means interconnecting the back gear member with the driven shaft; and at least one gear member rotatably mounted on the runner member, said gear member being in engagement with both the first and second gear portions.

11. A torque converter, comprising a housing; an engine shaft and a driven shaft rotatably mounted in the housing, the driven shaft having a portion extending laterally therefrom; an impeller member containing a longitudinally extending hub portion rotatably mounted on the engine shaft; a runner member rotatably mounted on the extending hub portion; fixed vanes mounted between the impeller member and the runner member for reversing the direction of flow of fluid between the impeller member and the runner member so as to urge them to rotate in opposite directions; a planetary gear set comprising two orbit gears and a planetary pinion interconnecting the engine shaft, the driven shaft and the impeller member to rotate the latter with the engine shaft at varying speeds depending on the speed of the driven shaft, the impeller member being connected to one orbit gear of the planetary set, the engine shaft being connected to the other orbit gear, and the planetary pinion being mounted on the laterally extending portion of the driven shaft; a first gear portion fixed adjacent the end of the hub portion of the impeller member; a back gear member rotatably mounted within the housing and containing a second gear portion; gear means interconnecting said back gear member with the driven shaft; and a pinion gear rotatably mounted on the runner member, said pinion gear being in engagement with both said first and second gear portions.

12. A torque converter, comprising a housing; an engine shaft and a driven shaft rotatably mounted in the housing, the driven shaft containing a portion extending laterally therefrom; an impeller member containing a longitudinally extending hub portion rotatably mounted on the engine shaft; a runner member rotatably mounted on the extending hub portion; fixed vanes mounted between the impeller member and the runner member for reversing the direction of flow of fluid between the impeller member and the runner member so as to urge them to rotate in opposite directions; a planetary gear set comprising two orbit gears and a planetary pinion interconnecting the engine shaft, the driven shaft and the impeller member to rotate the latter with the engine shaft at varying speeds depending on the speed of the driven shaft, the impeller member being connected to one orbit gear of the planetary set, the engine shaft being connected to the other orbit gear, and the planetary pinion being mounted on the laterally extending portion of the driven shaft; a first gear portion fixed adjacent the end of the hub portion of the impeller member; a back gear member rotatably mounted within the housing and having a second gear portion; gear means interconnecting said back gear member with the driven shaft; a pinion gear rotatably mounted on the runner member, said pinion gear being in engagement with both said first and second gear portions; a third gear portion fixed on the impeller member; a fourth gear portion fixed on the runner member; and gear means on a movable support in engagement with said third and fourth gear portions, the movable support becoming fixed when the speed of the runner member, when rotating about the engine shaft in the direction opposite to that of the impeller member, tends to exceed the speed of the latter.

HENRY A. MEYER.

REFERENCES CITED

The following references are of record in the file of this patent:

UNITED STATES PATENTS

| Number | Name | Date |
| --- | --- | --- |
| 1,962,972 | Stock | June 12, 1934 |
| 2,145,005 | Fichtner | Jan. 24, 1939 |
| 2,314,253 | Stewart | Mar. 16, 1943 |
| 2,480,032 | Kochis | Aug. 23, 1949 |